(12) United States Patent
Nyamwange et al.

(10) Patent No.: US 12,387,571 B2
(45) Date of Patent: Aug. 12, 2025

(54) AUTOMATED TELLER MACHINE DIGITAL TWIN WITH AN ANTI NFC/RFID SKIMMING THREAT DEVICE THROUGH MIST COMPUTATION

(71) Applicant: Bank of America Corporation, Charlotte, NC (US)

(72) Inventors: Elvis Nyamwange, Little Elm, TX (US); Sailesh Vezzu, Hillsborough, NJ (US); Amer Ali, Jersey City, NJ (US); Rahul Phadnis, Charlotte, NC (US); Rahul Yaksh, Austin, TX (US); Hari Vuppala, Charlotte, NC (US); Pratap Dande, Saint Johns, FL (US); Brian Jacobson, Los Angeles, CA (US); Erik Dahl, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/227,102

(22) Filed: Jul. 27, 2023

(65) Prior Publication Data
US 2025/0037548 A1    Jan. 30, 2025

(51) Int. Cl.
*G06V 20/52* (2022.01)
*G06Q 20/10* (2012.01)
(Continued)

(52) U.S. Cl.
CPC ....... *G07F 19/207* (2013.01); *G06Q 20/1085* (2013.01); *G06T 7/60* (2013.01); *G06V 10/751* (2022.01); *G06V 20/52* (2022.01)

(58) Field of Classification Search
USPC .......................................................... 705/43
See application file for complete search history.

(56) References Cited

U.S. PATENT DOCUMENTS

| | | | |
|---|---|---|---|
| 9,892,293 B1 * | 2/2018 | Wade ...................... | G06F 21/86 |
| 10,628,638 B1 * | 4/2020 | Walters ................. | G07F 7/0893 |

(Continued)

OTHER PUBLICATIONS

Title: Face Biometric Authentication System for ATM using deep learning Authors: Selvakumar R. et al. Date: Aug. 2022 (Year: 2022).*
Shubhra Jain, "ATM Frauds—Detection & Prevention," Proceedings of ARSSS International Conference, Jul. 30, 2017, New Delhi, India, 8 pages.

(Continued)

*Primary Examiner* — Bennett M Sigmond
*Assistant Examiner* — Yongsik Park
(74) *Attorney, Agent, or Firm* — Banner & Witcoff, Ltd.

(57) ABSTRACT

Aspects of the disclosure relate to detecting attempts to violate the security of an ATM. A computing system may determine whether an ATM is being used to perform a transaction. Based on the ATM not being used to perform a transaction, images of portions of the ATM may be generated. Estimated dimensions of the ATM may be determined. Digital twin data may be retrieved. The digital twin data may comprise a digital twin representation of the ATM and measured dimensions of the ATM. There may be a determination of whether the estimated dimensions of the ATM match the measured dimensions of the ATM. Based on the estimated dimensions of the ATM not matching the measured dimensions of the ATM, the ATM may be deactivated. Furthermore, a message indicating that the ATM was deactivated may be sent to a validation computing system.

17 Claims, 9 Drawing Sheets

(51) Int. Cl.
*G06T 7/60* (2017.01)
*G06V 10/75* (2022.01)
*G07F 19/00* (2006.01)

(56) References Cited

U.S. PATENT DOCUMENTS

| | | | |
|---|---|---|---|
| 10,769,896 B1* | 9/2020 | Farivar | G06V 40/28 |
| 10,777,047 B1* | 9/2020 | Hamchuck | G06T 19/006 |
| 10,878,430 B1* | 12/2020 | Yaqub | G06Q 50/265 |
| 11,295,319 B2* | 4/2022 | Mitchell | G07F 19/207 |
| 2013/0161388 A1* | 6/2013 | Mitchell | G07F 19/2055 |
| | | | 235/436 |
| 2014/0217169 A1* | 8/2014 | Lewis | G06Q 20/3274 |
| | | | 235/379 |

OTHER PUBLICATIONS

Minu et al., "A study on Vulnerabilities of Automatic Teller Machine," International Conference on Emerging Trends in Engineering & Management (ICETEM—2016), IOSR Journal of Computer Engineering (IOSR-JCE), e-ISSN: 2278-0661, p-ISSN: 2278-8727, 6 pages.

Sharma et al., "Analysis of Different Vulnerabilities in Auto Teller Machine Transactions," Journal of Global Research in Computer Science, vol. 3, No. 3, Mar. 2012, 4 pages.

Bhosale et al., "Survey on Frauds in Financial Transactions," (IJCSIT) International Journal of Computer Science and Information Technologies, vol. 5 (3) , 2014, 4711-4713, 3 pages.

Ofosu et al., "Design of a GSM-Based Skimming Reporting System for Automated Teller Machines," Jurnal Nasional Teknik Elektro, vol. 9, No. 3, Nov. 2020, p-ISSN: 2302-2949, e-ISSN: 2407-7267, 10 pages.

* cited by examiner

AUTOMATED TELLER MACHINE DIGITAL TWIN WITH AN ANTI NFC/RFID SKIMMING THREAT DEVICE THROUGH MIST COMPUTATION

TECHNICAL FIELD

Some aspects of the disclosure relate to automatically detecting attempts to violate the security of an automated teller machine (ATM). In particular, some aspects of the disclosure pertain to the detection of skimming devices through use of sensors and a digital twin representation of the ATM.

BACKGROUND

There are a variety of security threats that may compromise the integrity of an automated teller machine ("ATM"), also known as a banking machine. Some of these security threats may take the form of remote attacks on the ATM, while others are more localized and attempt to compromise the security of the ATM through the installation of a device that may be used to capture sensitive information. This sensitive information may in turn be used to compromise user accounts that are accessed via the ATM. For example, a skimming device (also known as a skimmer or ATM skimmer) that captures user information may be installed in close proximity to the ATM or physically attached to the ATM and then used to illicitly access confidential information from the banking cards of unwitting users.

Security measures to prevent such security breaches may take various forms including using security guards, installing security cameras to monitor the ATM, or adding anti-tampering devices to the ATM. However, these approaches may prove costly, require significant human intervention, or lead to false positive situations in which an ATM may be improperly shut down due to non-malicious activity that is treated as an attempt to breach ATM security. As a result, efforts aimed at protecting the security of an ATM may face numerous challenges.

SUMMARY

Aspects of the disclosure provide technical solutions to improve the effectiveness with which the security of an ATM may be safeguarded from fraudulent activity. The disclosed technology and may leverage the use of cameras to capture images and compare dimensions determined from the images to a digital twin representation in order to detect security violations of the ATM.

In accordance with one or more embodiments of the disclosure, a computing system may comprise one or more processors and memory storing computer-readable instructions that, when executed by the one or more processors, may cause the computing system to determine, based on one or more sensors that detect an environment comprising an automated teller machine (ATM), whether an ATM is being used to perform a transaction. The computing system may, based on the ATM not being used to perform a transaction, generate, based on a one or more cameras that detect the environment comprising the ATM, a plurality of images of a plurality of portions of the ATM. The computing system may determine a plurality of estimated dimensions of the plurality of portions of the ATM detected in the plurality of images. The computing system may retrieve digital twin data comprising a digital twin representation of the ATM. The digital twin representation of the ATM comprises a plurality of measured dimensions of the plurality of portions of the ATM. The computing system may determine whether the plurality of estimated dimensions of the plurality of portions of the ATM match the plurality of measured dimensions of the plurality of portions of the ATM. The computing system may, based on the plurality of estimated dimensions of the plurality of portions of the ATM not matching the plurality of measured dimensions of the plurality of portions of the ATM, deactivate the ATM. Furthermore, the computing system may send a message to a validation computing system configured to validate security safeguards of the ATM. The message may comprise an indication that the ATM was deactivated.

In one or more implementations, the digital twin data may comprise a plurality of measured spatial relationships between the plurality of portions of the ATM. Further, the computing system may store additional computer-readable instructions that, when executed by the one or more processors, further cause the computing system to: determine a plurality of estimated spatial relationships of the plurality of portions of the ATM detected in the plurality of images; determine whether the plurality of estimated spatial relationships of the plurality of portions of the ATM match the plurality of measured spatial relationships of the plurality of portions of the ATM; and based on the plurality of estimated spatial relationships of the plurality of portions of the ATM not matching the plurality of measured spatial relationships of the plurality of portions of the ATM, deactivate the ATM.

In one or more implementations, the digital twin data may comprise a plurality of stored visual features of the plurality of portions of the ATM. Further, the computing system may store additional computer-readable instructions that, when executed by the one or more processors, further cause the computing system to: determine a plurality of detected visual features of the plurality of portions of the ATM detected in the plurality of images; determine whether the plurality of detected visual features of the plurality of portions of the ATM match the plurality of stored visual features of the plurality of portions of the ATM; and based on the plurality of detected visual features of the plurality of portions of the ATM not matching the plurality of stored visual features of the plurality of portions of the ATM, deactivate the ATM.

In one or more implementations, the computing system may store additional computer-readable instructions that, when executed by the one or more processors, further cause the computing system to: determine a number of the one or more cameras that are occluded; and based on at least a threshold number of the one or more cameras being occluded, deactivate the ATM.

In one or more implementations, the computing system may store additional computer-readable instructions that, when executed by the one or more processors, further cause the computing system to: determine, based on inputting the plurality of images into one or more machine learning models, whether a foreign object is on the ATM. The foreign object may comprise a skimming device, one or more keys, a banking card, or a smartphone; and based on a foreign object being detected on the ATM, deactivate the ATM and/or send a message to the validation computing system. The message may comprise an indication that the foreign object is on the ATM.

In one or more implementations, the computing system may store additional computer-readable instructions that, when executed by the one or more processors, further cause the computing system to: determine, based on one or more light detection and ranging (LiDAR) devices, the plurality of measured dimensions of the ATM; and generate the digital twin data based on the plurality of measured dimensions of the ATM.

In one or more implementations, one or more sensors may comprise one or more thermal sensors configured to detect thermal signatures. Further, the memory may store additional computer-readable instructions to determine, based on one or more sensors that detect an environment comprising an automated teller machine (ATM), whether an ATM is being used to perform a transaction, that when executed by the one or more processors, further cause the computing system to: determine, based on the one or more thermal sensors detecting the thermal signature of a user within a predetermined distance of the ATM, that the ATM is being used to perform the transaction.

In one or more implementations, the memory may store additional computer-readable instructions to determine whether the plurality of estimated dimensions of the plurality of portions of the ATM match the plurality of measured dimensions of the plurality of portions of the ATM, that when executed by the one or more processors, further cause the computing system to: input the plurality of images and the digital twin data into one or more machine learning models that are configured to determine whether the plurality of images match the digital twin representation of the plurality of portions of the ATM.

In one or more implementations, one or more sensors or the one or more cameras may be end points of a mist computing infrastructure.

In one or more implementations, the plurality of portions of the ATM may comprise a display, interface elements of the display, a keypad, a cash dispenser, a deposit slot, a card reader, and/or a receipt printer.

In one or more implementations, the validation computing system may be part of a cloud computing infrastructure configured to communicate with a mist computing infrastructure comprising the one or more sensors and/or the one or more cameras.

In one or more implementations, the digital twin may comprise a three-dimensional representation of the ATM that may be based on measured physical dimensions of the ATM.

Corresponding methods (e.g., computer-implemented methods), apparatuses, devices, systems, and computer-readable media (e.g., non-transitory computer-readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
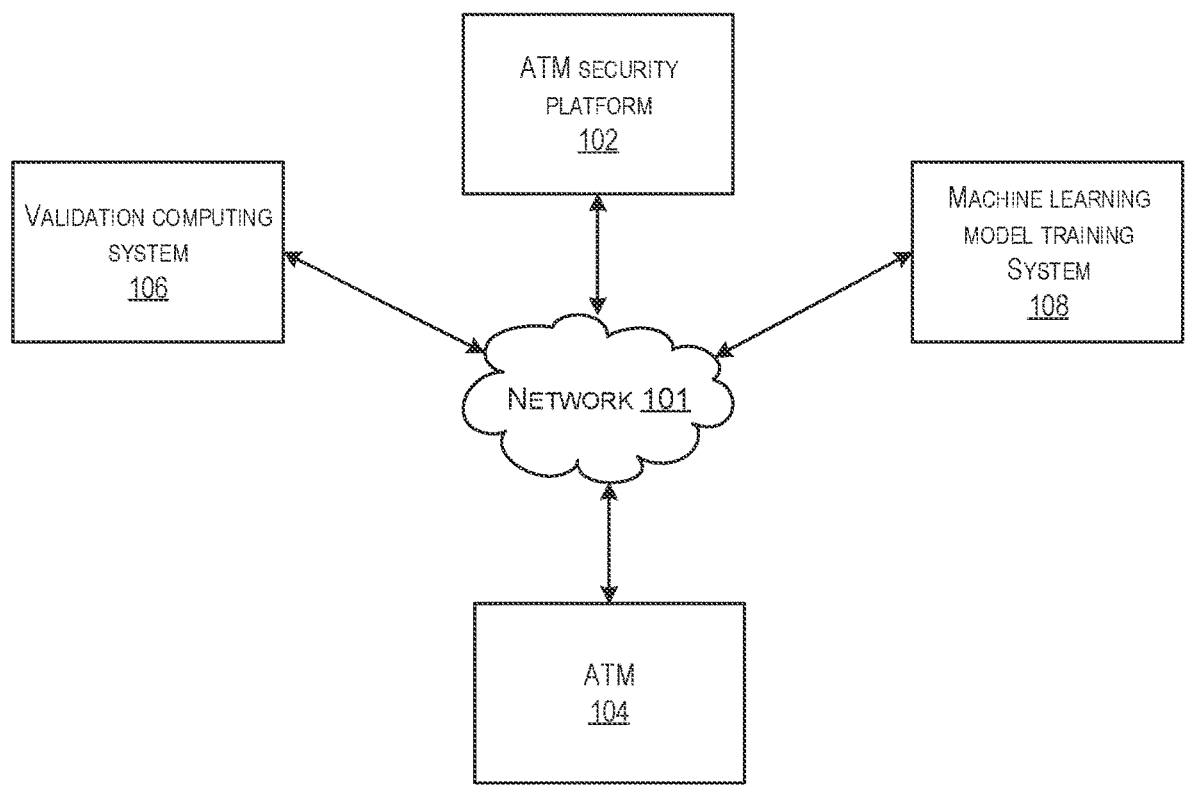
FIG. 1 depicts an illustrative computing environment for automated detection of attempts to violate ATM security in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer-readable media, and/or methods for automatically detecting attempts to violate the security of an ATM. The disclosed technology may leverage a digital twin, artificial intelligence (e.g., machine learning models), and various sensors (e.g., cameras and/or thermal sensors) to detect attempts to violate the security of an ATM. The use of these techniques may result in a variety of benefits and advantages including a reduction in the number of successful attempts to compromise the security of an ATM, less ATM downtime due to false security alerts, protection of confidential consumer information, more efficient use of computational resources achieved through use of machine learning models, and/or improved speed through the use of a mist computing infrastructure.

Further, the disclosed technology may use cameras to capture images of an ATM and compare the images of the ATM to a digital twin representation of the ATM. Differences between the ATM images and the digital twin representation of the ATM may indicate that there has been an attempt to violate the security of the ATM. For example, the disclosed technology may detect differences between a digital twin representation of an ATM and the actual ATM that result from the installation of a skimming device (e.g., a near field communication (NFC) skimming device and/or a radio frequency identification (RFID) skimming device) on an ATM (e.g., the surface of the ATM or a card reader slot of the ATM) in order to illicitly capture banking card information from users of the ATM. The slight difference in the ATM may be detected and flagged as an attempt to violate the security of the ATM. The ATM may then be deactivated (e.g., shut down to prevent further transactions on the ATM) and a message may be sent to a validation computing system that may coordinate actions to check the status of the ATM and reactivate the ATM at when appropriate.

In particular, the disclosed technology may determine, based on the use of sensors that detect an environment comprising an ATM, whether an ATM is being used to perform a transaction. For example, a computing system may use thermal and/or motion sensors to determine whether a user of the ATM is performing a transaction on the ATM. If the ATM is being used to perform a transaction, the computing system may (to preserve user privacy) not capture images of the ATM. Based on the ATM not being used to perform a transaction, a computing system may generate images of the ATM through use of cameras have the ATM in their field of view. Based on the images, a computing system may determine estimated dimensions of the ATM. For example, a computing system may determine the size of an ATM's main display screen, the length of an ATM's card reader, and/or the overall external dimensions of the ATM. The digital twin data may then be retrieved.

The digital twin data may comprise a digital twin representation of the ATM that may comprise measured dimensions of the ATM that were determined when the digital twin was generated. For example, the digital twin representation of the ATM may be generated by using LiDAR scanners to scan the ATM or another ATM with the same configuration and dimensions as the ATM (e.g., another ATM of the same make and model). The sensor output from the LiDAR scanners may then be encoded in the digital twin data which may also include visual features (e.g., images that represent the shape, color, and/or texture of the ATM) that may be based on camera images of the ATM.

A computing system may then compare the estimated dimensions of the ATM to the measured dimensions indicated in the digital twin data. If the estimated dimensions match (e.g., are similar within a predetermined margin of error) the measured dimensions, the ATM may be determined to be secure and/or free from tampering. However, if the estimated dimensions do not match the measured dimensions, the differences may indicate that the security of the ATM has been violated and/or that the ATM has been tampered with. In the event that the estimated dimensions of the ATM do not match the measured dimensions, a computing system may deactivate the ATM and thereby prevent further violations of the ATM's security. Additionally, a computing system may send a message to a validation computing system that is configured to validate security safeguards of the ATM. For example, a message indicating the location of the ATM, an indication that the ATM was deactivated, and/or a time at which the ATM was deactivated.

In accordance with one or more aspects of the disclosure, the technical effects and benefits described herein are provided to automatically detect attempts to violate the security of an ATM. These novel techniques may result in a reduction in security violations while also increasing the accuracy with which attempts to violate ATM security are detected. By way of introduction, one or more aspects of the disclosure may relate to systems, methods, devices, non-transitory computer-readable media, and techniques for automatically detecting attempts to violate the security of an ATM.

FIG. 1 depicts an illustrative computing environment for automated detection of attempts to violate ATM security in accordance with one or more aspects of the disclosure. Referring to FIG. 1, computing environment 100 may include one or more computing systems. For example, computing environment 100 may include ATM security platform 102, ATM 104, validation computing system 106, and machine learning model training system 108.

As described further below, ATM security platform 102 may comprise a computing system that includes one or more computing devices (e.g., computing devices comprising one or more processors, one or more memory devices, one or more storage devices, and/or communication interfaces) that may be used to detect attempts to violate the security of ATM 104. For example, the ATM security platform 102 may be configured to determine (e.g., using one or more sensors that may detect an environment comprising ATM 104) whether an ATM is being used to perform a transaction, generate (e.g., using cameras) a plurality of images of a plurality of portions of the ATM, determine estimated dimensions of the plurality of portions of the ATM, retrieve digital twin data comprising measured dimensions of the ATM, determine whether estimated dimensions match the measured dimensions, deactivate the ATM if the estimated dimensions do not match the measured dimensions, and send a message indicating that ATM 104 has been deactivated to validation computing system 106. ATM security platform 102 may comprise one or more sensors (e.g., thermal sensors, sonar, LiDAR, optical sensors, and/or motion sensors) that are configured to detect an environment comprising ATM 104. Further, ATM security platform 102 may comprise one or more cameras (e.g., visible light cameras and/or infrared cameras) that are configured to detect an environment comprising ATM 104. In some embodiments, the ATM security platform 102 may comprise one or more LiDAR devices that may be used to scan ATM 104 and/or generate LiDAR outputs that may be used to determine dimensions of ATM 104. In some embodiments, the computing environment 100 may comprise a mist infrastructure and the one or more cameras and/or one or more sensors of ATM security platform 102 may be end nodes of the mist infrastructure. Being end nodes of a mist infrastructure allows the one or more sensors and/or one or more cameras to convey data and/or information to the ATM security platform 102 with minimal or very low latency. Further, the mist infrastructure may allow data transmitted to and/or received from the one or more sensors and/or one or more cameras to be more secure by bypassing external networks. In some embodiments, the data transmitted in the mist infrastructure may be encrypted. Further, the computing environment may comprise a cloud infrastructure and validation computing system 106 may be part of the cloud infrastructure and may communicate with the one or more cameras and/or one or more sensors of the mist infrastructure that comprises ATM security platform 102 and/or ATM 104.

In some implementations, the ATM security platform 102 may transmit data (e.g., a message to validation computing system 106) that may be used to access information (e.g., digital twin data) associated with the ATM 104. The data transmitted by the ATM security platform 102 may be transmitted to ATM 104 and/or validation computing system 106 which may be configured to grant access to the ATM 104. For example, authorization to activate and/or deactivate ATM may be restricted to an authorized user of the ATM security platform 102 (e.g., a security administrator with permission to access, activate, and/or deactivate the ATM 104). Communication between the ATM security platform 102, ATM 104, validation computing system 106, and/or the machine learning model training system 108 may be encrypted. In some embodiments, the ATM security platform 102 may access one or more computing devices and/or computing systems remotely. For example, the ATM security platform 102 may remotely access the ATM 104 and/or the validation computing system 106.

ATM 104 may comprise a computing device or computing system that is configured to dispense funds, receive deposits, access account information, display account information, and/or otherwise perform operations to facilitate transactions (e.g., financial transactions) for a customer. In some embodiments, ATM 104 may comprise a point of sale terminal, a self-service banking kiosk, and/or some other device that may be used to perform financial transactions. The ATM 104 may be located at a different physical location than the ATM security platform 102 and/or the validation computing system 106. ATM 104 may comprise various components including a display (e.g., an LCD display), interface elements of the display (e.g., a graphical user interface that includes interface elements), a keypad (e.g., a keypad with moveable keys or a capacitive keypad), a cash dispenser, a deposit slot, a card reader (e.g., a card reader that may receive a physical card and/or an NFC reader that may wirelessly read a card), and/or a receipt printer. Although a single ATM 104 is shown, this is for illustrative purposes only, and any number of ATMs may be included in the computing environment 100 without departing from the scope of the disclosure. Further, ATM 104 may be a particular make and/or model and other ATMs of the same make and/or model may have the same configuration and/or dimensions (e.g., the same external dimensions and/or placement of ATM components including display, card readers, and/or cash dispensers).

Validation computing system 106 may comprise one or more computing devices and/or one or more computing systems. Each of the one or more computing devices and/or one or more computing systems may comprise one or more processors, one or more memory devices, one or more storage devices, and/or a communication interface that may be used to send and/or receive data and/or perform operations including determining whether to activate an ATM (e.g., reactivate ATM 104 when it is deactivated), deactivate an ATM, and/or grant access to an ATM (e.g., ATM 104). For example, the validation computing system 106 may receive, from the ATM security platform 102, a message indicating that ATM 104 has been deactivated. The message may comprise information associated with deactivating ATM 104 (e.g., images of the ATM 104) that the validation computing system 106 may analyze and use to determine whether to reactivate ATM 104. For example, validation computing system 106 may analyze images of ATM 104 to determine whether ATM 104 has been tampered with and/or whether a skimming device has been installed in ATM 104. In some embodiments, the message may be encrypted to prevent being read or tampered with by unauthorized entities. Further, the message may comprise a hardware configuration of ATM 104 (e.g., a make and model of ATM 104), a software configuration (e.g., a software version of ATM 104), and/or a location (e.g., a geographic location, street address, and/or an IP address) of ATM 104.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more images (e.g., images of ATM 104 or another ATM of the same make and/or model as ATM 104), one or more sensor outputs (e.g., sensor outputs from a thermal sensor and/or motion sensor), and/or one or more states of an ATM (e.g., states of ATM 104 indicating whether ATM 104 is operating properly). One or more machine learning models stored and/or trained on the machine learning model training system 108 may include the one or more machine learning models on the ATM security platform 102. Further, the one or more machine learning models of the ATM security platform 102 may be trained and/or updated by the machine learning model training system 108.

Computing environment 100 may include one or more networks, which may interconnect the ATM security platform 102, ATM 104, validation computing system 106, and/or machine learning model training system 108. For example, computing environment 100 may include a network 101 which may interconnect, e.g., ATM security platform 102, ATM 104, validation computing system 106, and/or machine learning model training system 108. Network 101 may comprise a combination of wireless and/or wired networks. In some instances, the network 101 may be a 4G data network, a 5G data network, and/or other data network.

In one or more arrangements, ATM security platform 102, ATM 104, validation computing system 106, and/or machine learning model training system 108 may comprise one or more computing devices capable of sending and/or receiving data and processing the data accordingly. For example, ATM security platform 102, ATM 104, validation computing system 106, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. Further, any combination of ATM security platform 102, validation computing system 106, and/or machine learning model training system 108 may, in some instances, be special-purpose computing devices configured to perform specific functions. For example, ATM security platform 102 may comprise one or more application specific integrated circuits (ASICs) that are configured to process digital twin data, implement one or more machine learning models, detect objects, recognize objects, compare images, determine whether different images match, deactivate ATM 104, and/or activate ATM 104.

Figure 2:
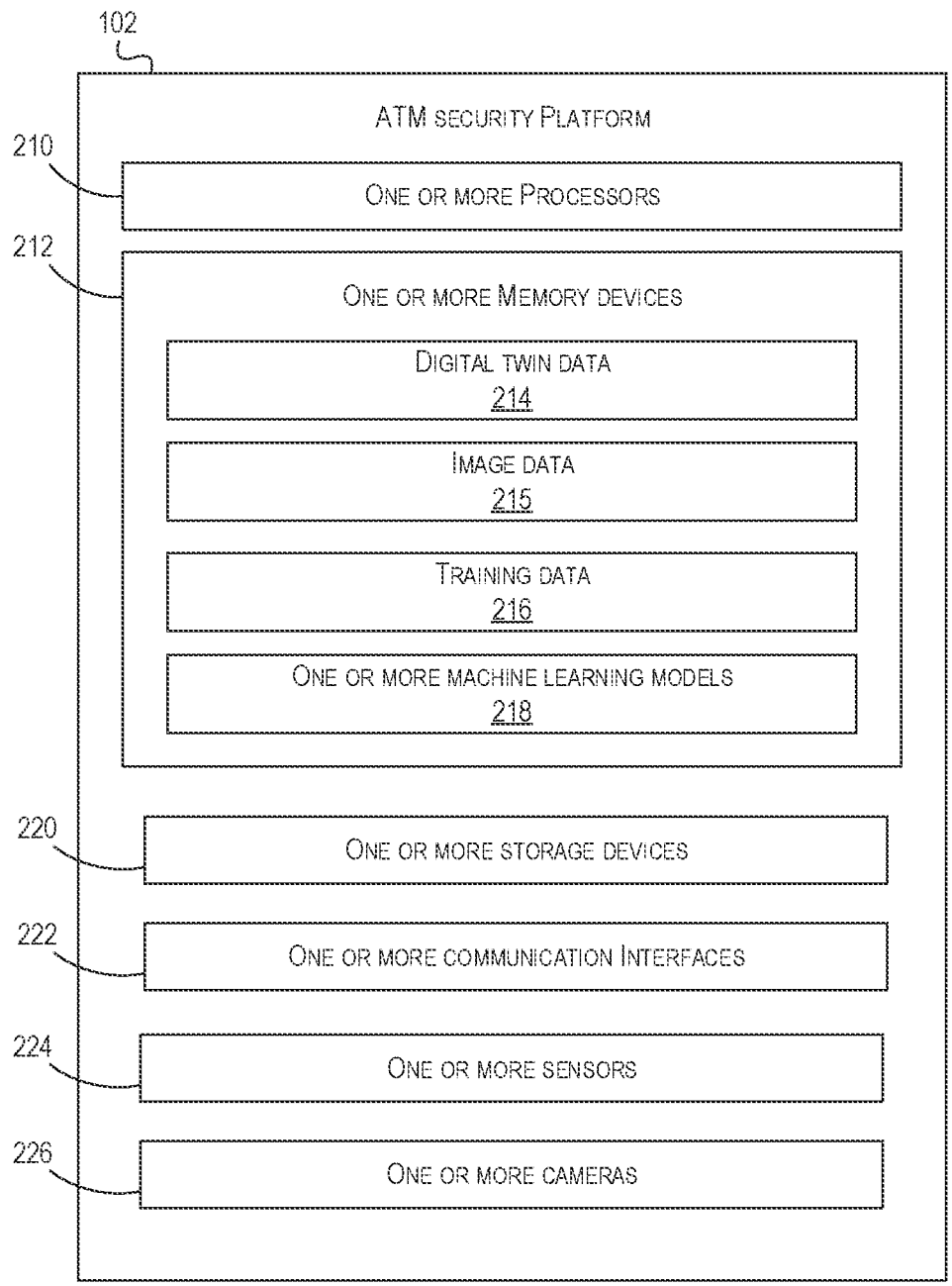
FIG. 2 depicts an illustrative computing platform for automated detection of attempts to violate ATM security in accordance with one or more aspects of the disclosure.

FIG. 2 depicts an illustrative computing platform for automated detection of attempts to violate ATM security in accordance with one or more aspects of the disclosure. ATM security platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between ATM security platform 102 and one or more networks (e.g., network 101, or the like). One or more communication interfaces 222 may be communicatively coupled to the one or more processor 210. The memory may include one or more program modules having instructions that when executed by one or more processor 210 cause the ATM security platform 102 to perform one or more functions described herein and/or access data that may store and/or otherwise maintain information which may be used by such program modules and/or one or more processors 210. The one or more memory devices 212 may comprise RAM. In some instances, the one or more program modules and/or databases may be stored by and/or maintained in different memory units of ATM security platform 102 and/or by different computing devices that may form and/or otherwise make up ATM security platform 102. For example, the memory may have, host, store, and/or include digital twin data 214, training data 216, and/or one or more machine learning models 218. One or more storage devices 220 (e.g., solid state drives and/or hard disk drives) may also be used to store data including the digital twin data. The one or more storage devices 220 may comprise non-transitory computer-readable media that may store data when the one or more storage devices 220 are in an active state (e.g., powered on) or an inactive state (e.g., sleeping or powered off).

Digital twin data 214 may comprise digital twin data that comprises a digital twin representation of an ATM (e.g., ATM 104). Digital twin data 214 may comprise a three-dimensional model that includes indications of physical dimensions of various components of ATM 104. For example, digital twin data 214 may comprise indications of the size (e.g., size in millimeters) of the display of ATM 104 and/or the dimensions of a card reader of ATM 104. Further, digital twin data 214 may be used to determine various spatial relationships between different components of ATM 104. For example, the spatial relationships may comprise distances between different components of ATM 104 and/or the position of components relative to other components of ATM 104. Image data 215 may comprise one or more images captured by ATM security platform 102, one or more sensors 224, and/or one or more cameras 226. For example, image data 215 may comprise one or more images of ATM 104 and/or the environment in which ATM 104 is located. In some embodiments, image data 215 may be encrypted. Training data 216 may comprise one or more images of ATM 104 that may be used to train one or more machine learning models (e.g., machine learning models 218).

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate digital twin data 214, image data 215, and/or training data 216. Further, the one or more machine learning models 218 may generate output including indications of whether images of an ATM match corresponding images of a digital twin representation of the ATM as described herein. Further, one or more machine learning models 218 may comprise one or more instructions that direct and/or cause the ATM security platform 102 to access the digital twin data 214, image data 215, training data 216, and/or perform other functions. Further, one or more machine learning models 218 may comprise a machine learning model that comprises one or more instructions to detect objects (e.g., foreign objects) as described herein.

One or more sensors 224 may comprise one or more sensors that are configured to detect the state of an environment and/or changes in the state of the environment. For example, one or more sensors 224 may comprise thermal sensors, sonar, LiDAR, and/or motion sensors that may detect changes in an environment and/or detect people in an environment. One or more cameras 226 may comprise one or more visible light cameras and/or infrared cameras that are configured to detect the state of an environment comprising ATM 104 and/or changes in the state of an environment comprising ATM 104. For example, one or more cameras 226 may be used to determine (e.g., based on comparison of images of ATM 104 to a digital twin representation of ATM 104) whether dimensions of ATM 104 have changed.

Figure 3:
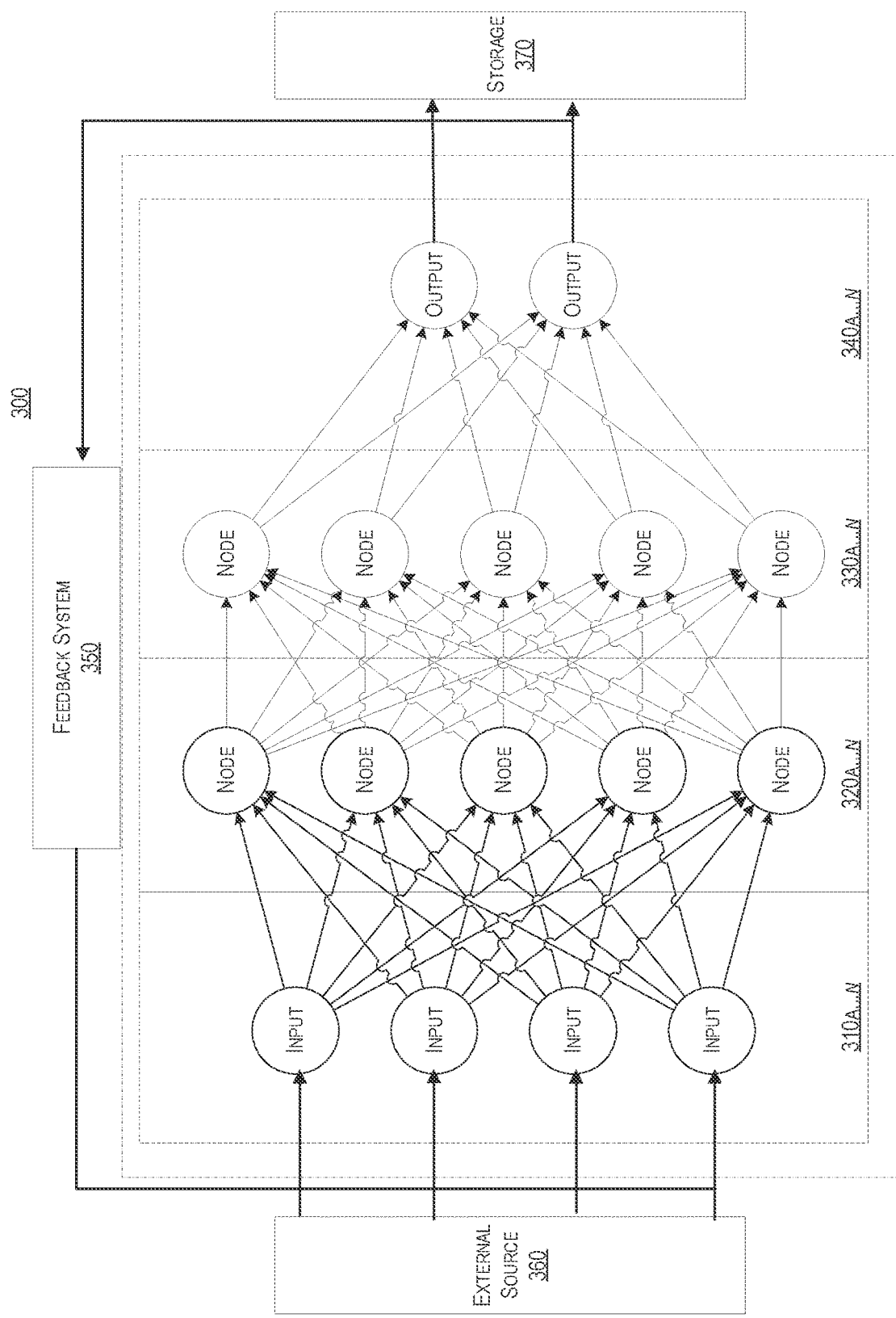
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310a-n may be connected to a first set of processing nodes 320a-n. Each of the first set of processing nodes 320a-n may be connected to each of a second set of processing nodes 330a-n. Each of the second set of processing nodes 330a-n may be connected to each of output nodes 340a-n. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310a-n may originate from an external source 360. Output may be sent to a feedback system 350 and/or to storage 370. The feedback system 350 may send output to the input nodes 310a-n for successive processing iterations with the same or different input data.

In one illustrative method using feedback system 350, the system may use machine learning to determine an output. The output may include indications of whether compared values match (e.g., indications of whether estimated dimensions match measured dimensions), detection output (e.g., output indicating a foreign object has been detected), recognition output (e.g., output indicating a user of an ATM has been recognized), regression output, confidence values, and/or classification output. The system may use any machine learning model including one or more generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310$a$-$n$ may comprise logical inputs of different data sources, such as one or more data servers. The processing nodes 320$a$-$n$ may comprise parallel processes executing on multiple servers in a data center. And, the output nodes 340$a$-$n$ may be the logical outputs that ultimately are stored in results data stores, such as the same or different data servers as for the input nodes 310$a$-$n$. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310$a$-$n$ may be processed through processing nodes, such as the first set of processing nodes 320$a$-$n$ and the second set of processing nodes 330$a$-$n$. The processing may result in output in output nodes 340$a$-$n$. As depicted by the connections from the first set of processing nodes 320$a$-$n$ and the second set of processing nodes 330$a$-$n$, processing may comprise multiple steps or sequences. For example, the first set of processing nodes 320$a$-$n$ may be a rough data filter, whereas the second set of processing nodes 330$a$-$n$ may be a more detailed data filter.

The artificial neural network 300 may be configured to effectuate decision-making. As a simplified example for the purposes of explanation, the artificial neural network 300 may be configured to generate comparison output (e.g., indications of whether estimated dimensions match measured dimensions to which the estimated dimensions are compared), and/or classification output (e.g., indications of the classification of objects depicted in an image). The input nodes 310$a$-$n$ may be provided with image data and/or digital twin data that is based on the appearance of an ATM. The first set of processing nodes 320$a$-$n$ may be each configured to perform specific steps to analyze the image data, such as determining estimated dimensions of portions of an object (e.g., an ATM) depicted in the image data. The second set of processing nodes 330$a$-$n$ may be each configured to analyze digital twin data in order to determine whether dimensions of objects depicted in the image data match a digital twin representation of the object in the digital twin data. Multiple subsequent sets may further refine this processing, each looking for further more specific tasks, with each node performing some form of processing which need not necessarily operate in the furtherance of that task. The artificial neural network 300 may then execute or cause to be executed operations that cause an ATM to be activated and/or deactivated.

The feedback system 350 may be configured to determine the accuracy of the artificial neural network 300. Feedback may comprise an indication of similarity between the value of an output generated by the artificial neural network 300 and a ground-truth value. For example, in the digital twin data analysis example provided above, the feedback system 350 may be configured to determine a similarity value based on comparisons of image data to digital twin data. The feedback system 350 may already have access to the ground-truth data (e.g., whether an object in an image actually matches a digital twin representation of the object in the image), such that the feedback system may train the artificial neural network 300 by indicating the accuracy of the output generated by the artificial neural network 300. The feedback system 350 may comprise human input, such as an administrator indicating to the artificial neural network 300 whether it made a correct decision. The feedback system may provide feedback (e.g., an indication of whether the previous output was correct or incorrect) to the artificial neural network 300 via input nodes 310$a$-$n$ or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and validate image data and/or digital twin data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process image data and/or digital twin data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning. In some implementations, the artificial neural network 300 may receive input including one or more input features. The one or more input features may comprise information associated with images of ATMs of various makes and/or models.

Figure 4:
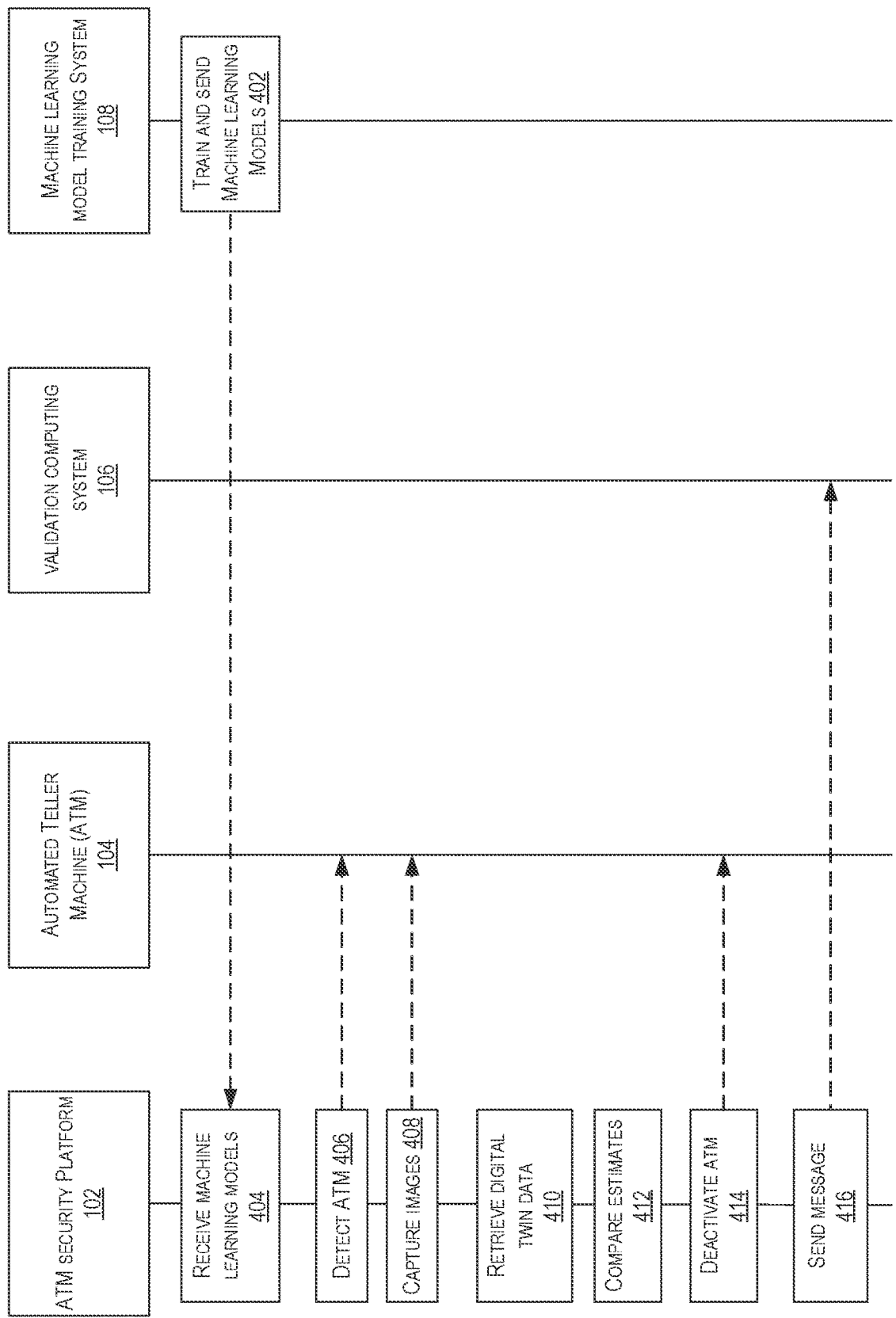
FIG. 4 depicts an illustrative event sequence for automated detection of attempts to violate ATM security in accordance with one or more example embodiments.

FIG. 4 depicts an illustrative event sequence for automated detection of attempts to violate ATM security in accordance with one or more example embodiments. Referring to FIG. 4, at step 402, a connection may be established between ATM security platform 102 and the machine learning model training system 108. For example, the ATM security platform 102 may establish a data connection with the machine learning model training system 108 to in order to receive an updated copy of one or more machine learning models (e.g., the one or more machine learning models 218 that are described with respect to FIG. 2 and/or the artificial neural network 300 that is described with respect to FIG. 3) that may be used to perform various operations including detecting objects (e.g., foreign objects), recognizing objects and/or images, comparing objects and/or images, and/or determining whether objects in different images match (e.g., determining whether images of an actual ATM match images from a digital twin representation of the ATM). In some instances, the machine learning model training system 108 may determine whether the ATM security platform 102 has an updated copy of the one or more machine learning models and may send an indication to the ATM security platform 102 if an update is warranted.

At step 404, the ATM security platform 102 may receive the one or more machine learning models and perform an update of the one or more machine learning models stored on the ATM security platform 102 if an update is warranted. The updates to the one or more machine learning models may be more effectively trained to detect and/or recognize objects, thereby allowing the ATM security platform 102 to more effectively analyze different types of ATMs and determine whether security of the ATMs has been violated. At step 406, the ATM security platform 102 may use one or more sensors to detect an environment (e.g., a bank or convenience store) that comprises the ATM 104. The ATM security platform 102 may use the one or more machine learning models to analyze sensor data generated by the one or more sensors in order to determine whether the ATM 104 is being used to perform a transaction. Based on the ATM security platform 102 determining that ATM 104 is not being used to perform a transaction (e.g., a user is not using the ATM 104 to withdraw funds), ATM security platform 102 may capture one or more images of ATM 104 at step 408. At step 410, ATM security platform 102 may retrieve digital twin data that may be stored locally on ATM security platform 102. In some embodiments, ATM security platform 102 may retrieve digital twin data from validation computing system 106. The digital twin data may comprise a digital twin representation of ATM 104. Further, the digital twin data may comprise measured dimensions of ATM 104 (e.g., a distance between different components of ATM 104 and/or a size of various components of ATM 104).

At step 412, ATM security platform 102 may determine estimated dimensions of ATM 104 and compare the estimated dimensions of ATM 104 to the measured dimensions of ATM 104 that are indicated in the digital twin data. At 414, based on the estimate dimensions not matching the measured dimensions, ATM security platform 102 may deactivate ATM 104. For example, ATM security platform 102 may deactivate ATM 104 by sending data comprising a deactivation command to ATM 104 which may be configured to deactivate when ATM 104 receives the deactivation command. Further, at step 416, ATM security platform 102 may send a message to validation computing system 106. The message may comprise an indication that ATM 104 has been deactivated. Validation computing system 106 may be configured to remotely check the status of ATM 104 to determine the state of ATM 104 and/or access ATM security platform 102 to determine more information about the state of ATM 104. Further, validation computing system 106 may be configured to send a message to maintenance or security personnel to check the status of ATM 104 and/or activate ATM 104 if ATM 104 is deactivated.

Figure 5:
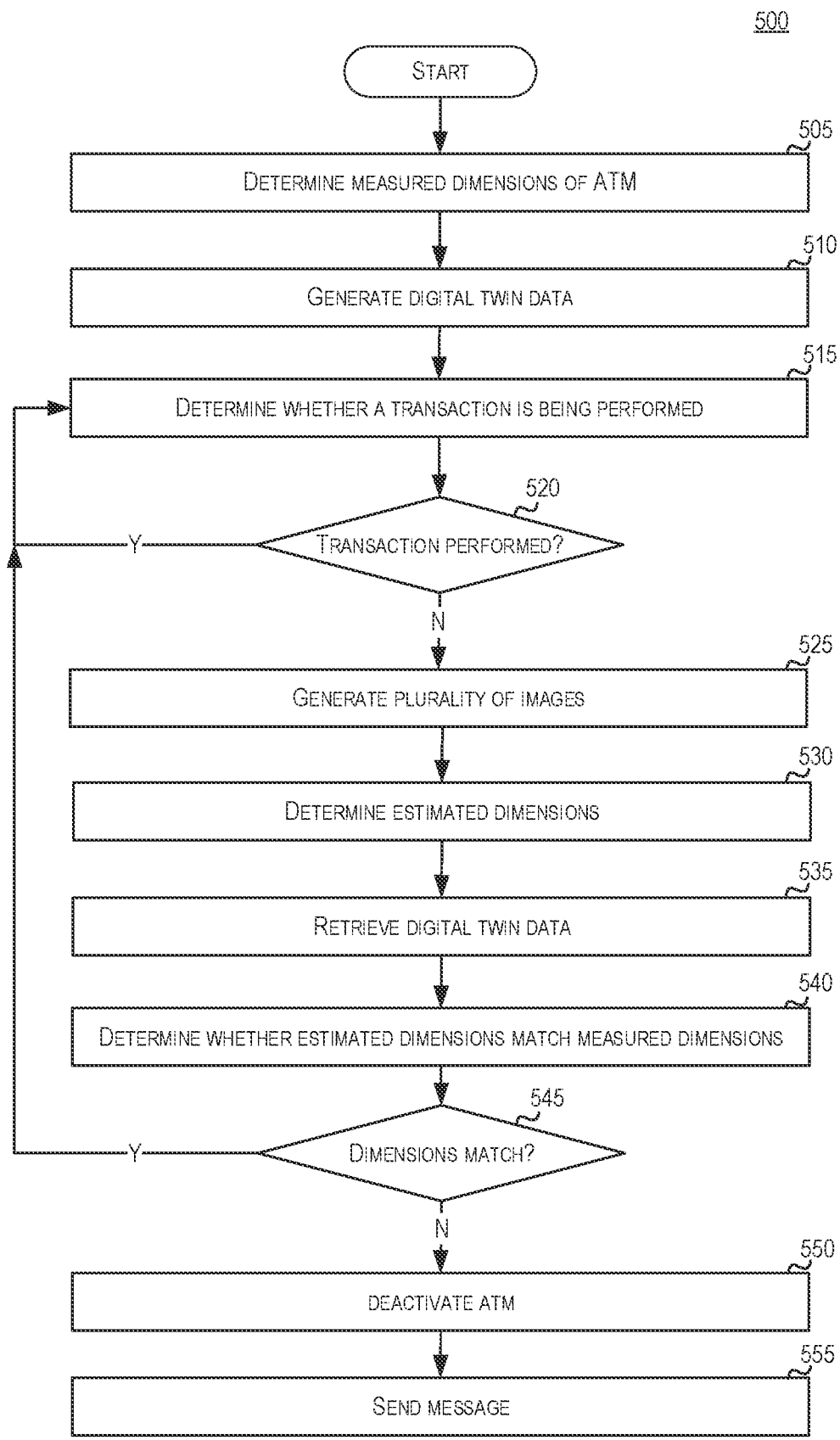
FIG. 5 depicts an illustrative method for automatically detecting attempts to violate ATM security in accordance with one or more example embodiments.

FIG. 5 depicts an illustrative method for automatically detecting attempts to violate ATM security in accordance with one or more example embodiments. The steps of a method 500 for automatically detecting attempts to violate ATM security may be implemented by a computing device or computing system (e.g., the ATM security platform 102) in accordance with the computing devices and/or computing systems described herein. One or more of the steps described with respect to FIG. 5 may be omitted, performed in a different order, and/or modified. Further, one or more other steps (e.g., the steps described with respect to FIGS. 6-9) may be added to the steps described with respect to FIG. 5.

At step 505, a computing system may determine, based on one or more light detection and ranging (LiDAR) devices, a plurality of dimensions of the ATM. For example, ATM security platform 102 may comprise one or more LiDAR devices that may be used to scan ATM 104 to determine dimensions (e.g., length, width, and/or height of various portions of ATM 104) of ATM 104. In some embodiments, other sensors described herein (e.g., cameras and/or sonar) may be used to determine dimensions of the ATM.

At step 510, a computing system may generate digital twin data comprising a digital twin representation of the ATM that may be based on the plurality of dimensions of the ATM. For example, ATM security platform 102 and/or validation computing system 106 generate digital twin data comprising a digital twin representation based on the plurality of dimensions of the ATM that was scanned with the LiDAR devices and/or other sensors. The digital twin representation may comprise a three-dimensional model of the ATM. Further, the digital twin representation of the ATM may represent components of the ATM and may comprise measurements of various portions of the ATM. For example, the digital twin representation of the ATM may indicate length, width, and/or height of the ATM and individual components (e.g., display, card reader, and/or keypad) of the ATM. Further, the digital twin representation of the ATM may comprise indications of colors and/or textures of a plurality of portions of the ATM. For example, the digital twin representation may comprise indications that certain portions of an ATM are a specific shade of black or grey and/or that other portions of the ATM are a specific shade of red. In some embodiments, the digital twin representation of the ATM may be updated based on changes to the ATM (e.g., the configuration of the ATM has changed to include a different display and/or different keypad).

At step 515, a computing system may determine, based on one or more sensors that detect an environment comprising an automated teller machine (ATM), whether an ATM is being used to perform a transaction. For example, ATM security platform 102 may comprise one or more thermal sensors that are configured to detect users of an ATM. Based on the one or more sensors detecting a thermal signature that corresponds to an ATM being used to perform a transaction (e.g., a thermal signature corresponding to a human body in front of an ATM), ATM security platform 102 may determine whether an ATM is being used to perform a transaction.

At step 520, a computing system may, based on determining that the ATM is not being used to perform a transaction, perform step 525. For example, a computing system (e.g., the ATM security platform 102) may analyze data from the one or more sensors (e.g., motion sensors) and determine that a transaction is being performed by a user of the ATM. Based on determining that the ATM is not to be being used to perform a transaction, a computing system may perform step 515. For example, a computing system (e.g., the ATM security platform 102) may analyze data from the one or more sensors (e.g., thermal sensors) and determine that no users are in the area around the ATM and that a transaction is not being performed on the ATM.

At step 525, a computing system may generate, based on a one or more cameras that detect the environment comprising the ATM, a plurality of images of a plurality of portions of the ATM. For example, one or more cameras of ATM security platform 102 may be used to capture video and/or still images of ATM 104. The portions of the ATM may comprise components of the ATM (e.g., display and/or card reader). The plurality of images may comprise portions of the ATM captured from one or more angles. For example, the plurality of images may comprise images of the ATM from the front, rear, and/or sides.

Further, the plurality of images may comprise images of one or more components of the ATM. For example, the plurality of images may comprise images of a display of an ATM, a keypad of an ATM, and/or a card reader of an ATM. Further, the plurality of images may be captured at one or more distances from the ATM. For example, the plurality of images may comprise an image of an ATM component (e.g., a card reader) at different levels of magnification. In some embodiments, one or more sensors including LiDAR devices and/or sonar devices may be used to detect ATM 104. For example, one or more LiDAR devices and/or one or more sonar devices may be used to scan an ATM and generate data indicating the shape, size, texture, and/or features of objects comprising the ATM.

At step 530, a computing system may determine a plurality of estimated dimensions of the plurality of portions of the ATM detected in the plurality of images. For example, ATM security platform 102 may analyze the plurality of images and/or output from the one or more cameras and/or one or more sensors (e.g., LiDAR output) to determine estimated dimensions of ATM 104, estimated dimensions of portions of ATM 104, and/or estimated dimensions of components of ATM 104. The plurality of estimated dimensions may be associated with vectors indicating a distance and direction of one or more portions of the ATM. In some embodiments, one or more machine learning models may be configured to receive input comprising the plurality of images, detect features of the plurality of images, and generate output comprising the plurality of estimated dimensions of the plurality of portions of the ATM.

At step 535, a computing system may retrieve digital twin data comprising a digital twin representation of the ATM (e.g., the digital twin data generated at step 510). The digital twin representation of the ATM may comprise a plurality of measured dimensions of the plurality of portions of the ATM. For example, a computing system (e.g., the ATM security platform 102) may retrieve digital twin data from validation computing system 106. The digital twin data may comprise a three-dimensional representation of the ATM and/or another very similar ATM (e.g., within some predetermined degree of similarity) that may be of the same make and/or model of the ATM.

At step 540, a computing system may determine whether the plurality of estimated dimensions of the plurality of portions of the ATM match the plurality of measured dimensions of the plurality of portions of the ATM. For example, a computing system (e.g., the ATM security platform 102) may compare the plurality of estimated dimensions of the plurality of portions of the ATM to the plurality of measured dimensions of the plurality of portions of the ATM. ATM security platform 102 may determine one or more differences between the plurality of estimated dimensions of the plurality of portions of the ATM and the plurality of measured dimensions of the plurality of portions of the ATM. Based on an extent of the one or more differences between the plurality of estimated dimensions of the plurality of portions of the ATM and the plurality of measured dimensions of the plurality of portions of the ATM being above a similarity threshold, the computing system may determine that the plurality of estimated dimensions of the plurality of portions of the ATM match the plurality of measured dimensions of the plurality of portions of the ATM.

For example, if the differences between an estimated dimension (e.g., length) of a card reader and a measured dimension (e.g., length) of the card reader is less than a tenth of a millimeter (0.1 mm), the estimated dimension of the card reader may be determined to match the measured distance of the card reader. ATM 104 may generate match data indicating whether the plurality of estimated dimensions of the plurality of portions of the ATM match the plurality of measured dimensions of the plurality of portions of the ATM (e.g., output indicating "YES" or "1" if there is a match, or output indicating "NO" or "0" if there is not a match.

At step 545, a computing system may, based on the plurality of estimated dimensions of the plurality of portions of the ATM not matching the plurality of measured dimensions of the plurality of portions of the ATM, perform step 550. For example, ATM security platform 102 may analyze match data and based on the match data indicating "NO" or "0" determine that the plurality of estimated dimensions of the plurality of portions of the ATM do not match the plurality of measured estimated dimensions of the plurality of portions of the ATM. Based on the plurality of estimated dimensions of the plurality of portions of the ATM matching the plurality of measured dimensions of the plurality of portions of the ATM, a computing system may perform step 515. For example, ATM security platform 102 may analyze match data and based on the match data indicating "YES" or "1" determine that the plurality of estimated dimensions of the plurality of portions of the ATM match the plurality of measured estimated dimensions of the plurality of portions of the ATM.

At step 550, a computing system may deactivate the ATM. For example, ATM security platform 102 may send data comprising a deactivation command to ATM 104. Based on ATM 104 receiving the deactivation command, ATM 104 may deactivate (e.g., ATM 104 may stop operating until ATM 104 is reactivated by an authorized entity which may comprise ATM security platform 102 and/or validation computing system 106).

At step 555, a computing system may send a message to a validation computing system configured to validate security safeguards of the ATM. The message may comprise an indication that the ATM was deactivated, a time and/or date at which the ATM was deactivated, a location of the ATM, and/or an image of the ATM (e.g., an image from the plurality of images) showing the ATM after being deactivated. For example, ATM security platform 102 may send a message comprising an indication that ATM 104 was deactivated at 1:02 P.M. and/or an image of an RFID skimming device placed on the ATM 104. In some embodiments, the message may comprise an alert indicating that the security of the ATM may have been violated and/or a request for assistance to investigate and/or reactivate the ATM.

Figure 6:
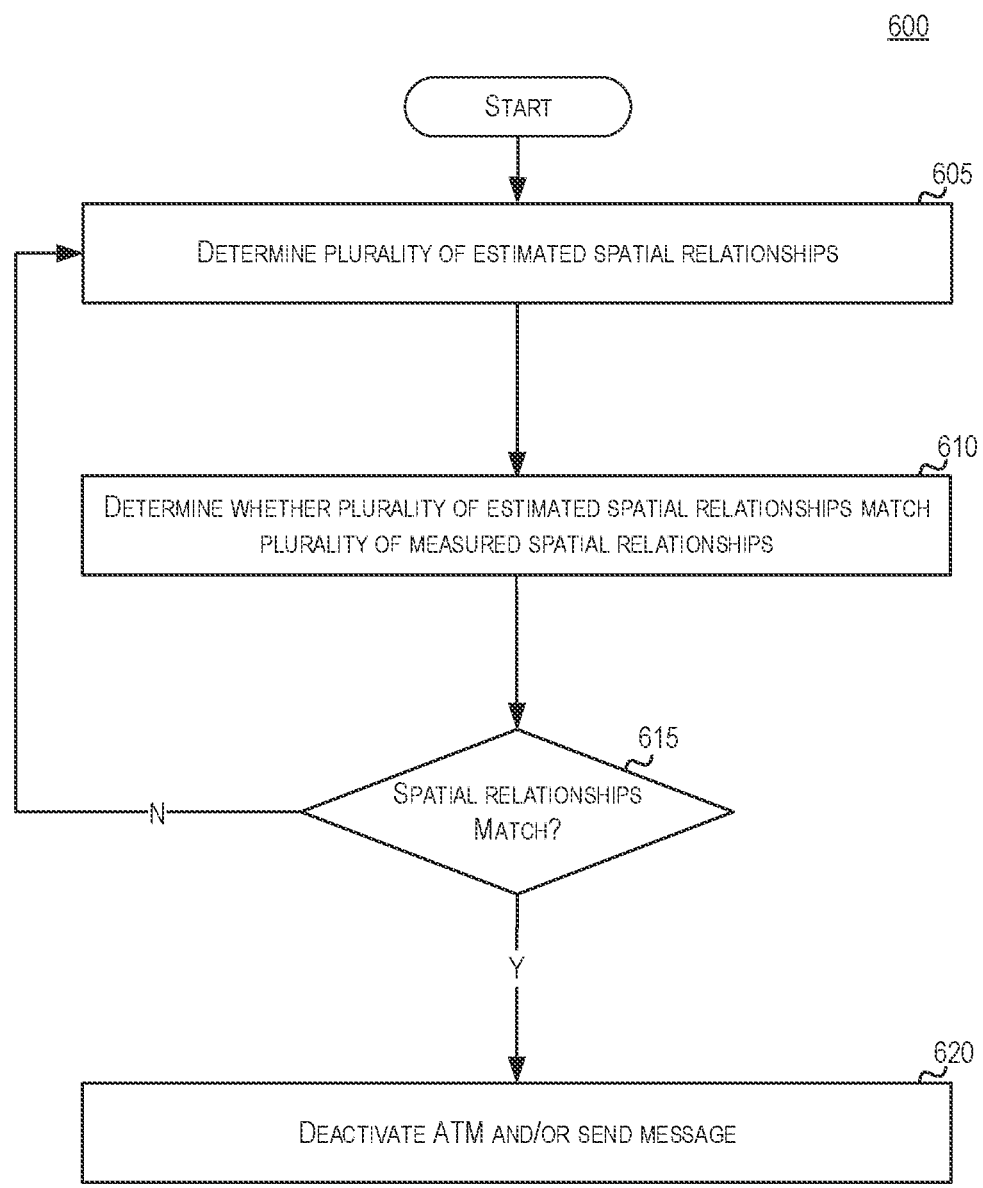
FIG. 6 depicts an illustrative method for automatically detecting and matching spatial relationships of an ATM in accordance with one or more example embodiments.

FIG. 6 depicts an illustrative method for automatically detecting and matching spatial relationships of an ATM in accordance with one or more example embodiments. The steps of a method 600 for automatically detecting and matching spatial relationships of an ATM may be implemented by a computing device or computing system (e.g., the ATM security platform 102) in accordance with the computing devices and/or computing systems described herein. One or more of the steps described with respect to FIG. 6 may be omitted, performed in a different order, and/or modified. Further, one or more other steps (e.g., the steps described with respect to FIGS. 5 and 7-9) may be added to the steps described with respect to FIG. 6.

At step 605, a computing system may determine a plurality of estimated spatial relationships of the plurality of portions of the ATM detected in the plurality of images. For example, ATM security platform 102 may analyze the plurality of images and/or output from one or more sensors (e.g., LiDAR output) to determine spatial relationships of ATM 104, spatial relationships of portions of ATM 104, and/or spatial relationships between components of ATM 104. In some embodiments, one or more machine learning models may be configured to receive input comprising the plurality of images and/or sensor output (e.g., LiDAR output), detect features of the plurality of images, and generate output comprising the plurality of spatial relationships of the plurality of portions of the ATM detected in the plurality of images.

At step 610, a computing system may determine whether the plurality of estimated spatial relationships of the plurality of portions of the ATM match the plurality of measured spatial relationships of the plurality of portions of the ATM. For example, ATM security platform 102 may compare the plurality of estimated spatial relationships of the plurality of portions of the ATM to the plurality of measured spatial relationships of the plurality of portions of the ATM. ATM security platform 102 may determine one or more differences between the plurality of estimated spatial relationships of the plurality of portions of the ATM and the plurality of measured spatial relationships of the plurality of portions of the ATM. Based on a magnitude of the one or more differences between the plurality of estimated spatial relationships of the plurality of portions of the ATM and the plurality of measured spatial relationships of the plurality of portions of the ATM being below a similarity threshold, the computing system may determine that the plurality of estimated spatial relationships of the plurality of portions of the ATM match the plurality of measured spatial relationships of the plurality of portions of the ATM.

For example, if the differences between estimated spatial relationships (e.g., an area of an ATM display in relation to an area of a keypad of the ATM) and measured spatial relationships are less than point five percent (0.5%), the estimated spatial relationships of the ATM display relative to the ATM keypad may be determined to match the measured spatial relationships of the ATM display relative to the ATM keypad. ATM 104 may generate match data indicating whether the plurality of estimated spatial relationships of the plurality of portions of the ATM match the plurality of measured spatial relationships of the plurality of portions of the ATM (e.g., output indicating "YES" or "1" if there is a match, or output indicating "NO" or "0" if there is not a match.

At step 615, a computing system may, based on the plurality of estimated spatial relationships of the plurality of portions of the ATM not matching the plurality of measured spatial relationships of the plurality of portions of the ATM, perform step 620. For example, ATM security platform 102 may analyze data indicating that indicating that there is not a match (e.g., data indicating "NO") between the plurality of estimated spatial relationships of the plurality of portions of the ATM and the plurality of measured spatial relationships of the plurality of portions of the ATM. Based on the plurality of estimated spatial relationships of the plurality of portions of the ATM matching the plurality of measured spatial relationships of the plurality of portions of the ATM, a computing system may perform step 605. For example, the ATM security platform 102 may access and/or analyze data (e.g., data indicating "YES") indicating that the plurality of estimated spatial relationships of the plurality of portions of the ATM matches the plurality of measured spatial relationships of the plurality of portions of the ATM.

At step 620, a computing system may deactivate the ATM and/or send a message comprising an indication that the plurality of estimated spatial relationships of the plurality of portions of the ATM do not match the plurality of measured spatial relationships of the plurality of portions of the ATM. For example, ATM security platform 102 may deactivate ATM 104 as described herein (e.g., step 550 of method 500) by sending data comprising a deactivation command to ATM 104. By way of further example, ATM security platform 102 may send a message to validation computing system 106. The message may indicate that ATM 104 is deactivated and/or that the plurality of estimated spatial relationships of the plurality of portions of the ATM do not match the plurality of measured spatial relationships of the plurality of portions of the ATM. In some embodiments, the message may comprise an image of the portions of the ATM with estimated spatial relationships that do not match the measured spatial relationships.

Figure 7:
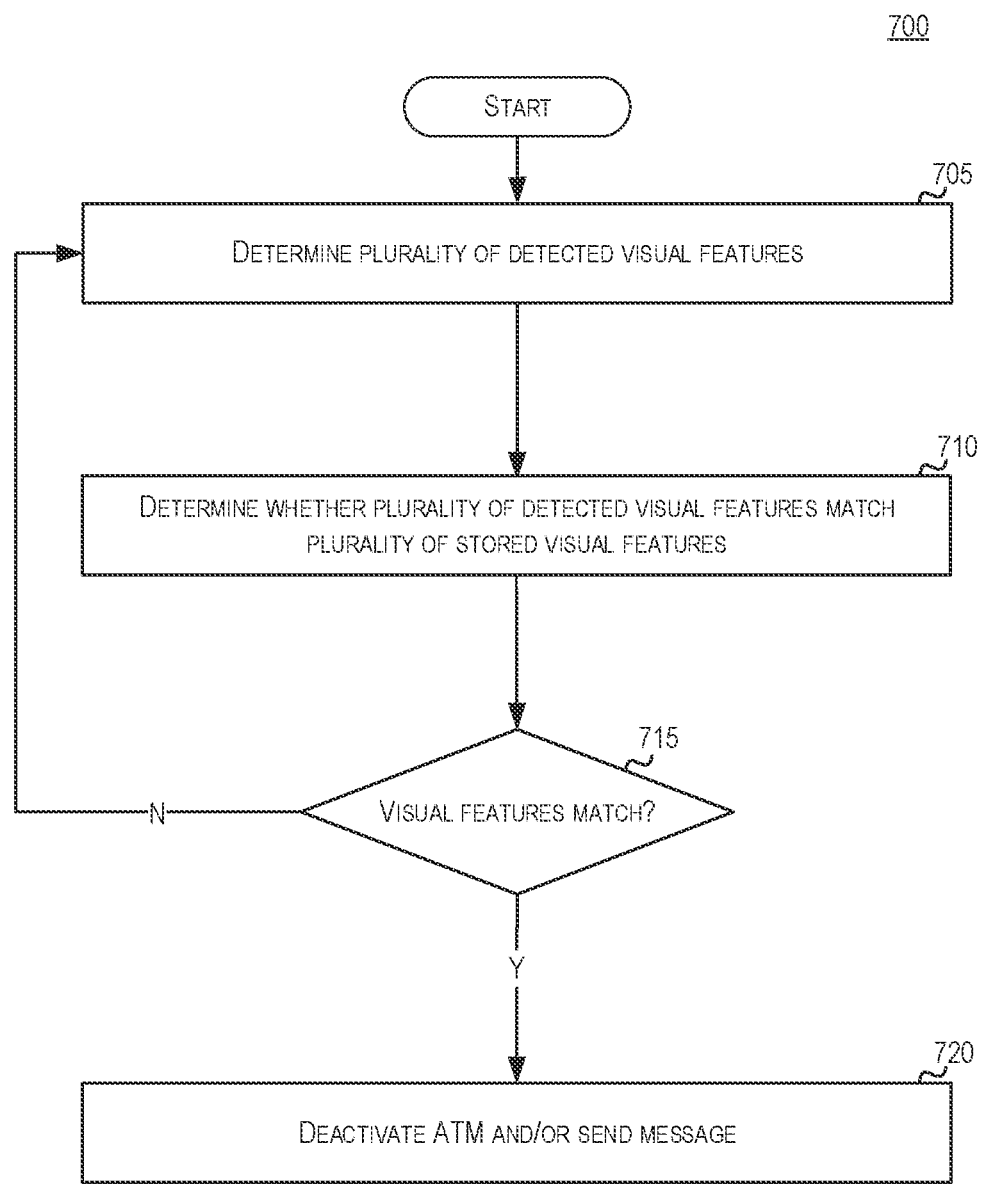
FIG. 7 depicts an illustrative method for automatically detecting and matching visual features of an ATM in accordance with one or more example embodiments.

FIG. 7 depicts an illustrative method for automatically detecting and matching visual features of an ATM in accordance with one or more example embodiments. The steps of a method 700 for automatically detecting and matching visual features of an ATM may be implemented by a computing device or computing system (e.g., the ATM security platform 102) in accordance with the computing devices and/or computing systems described herein. One or more of the steps described with respect to FIG. 7 may be omitted, performed in a different order, and/or modified. Further, one or more other steps (e.g., the steps described with respect to FIGS. 5, 6, 8, and 10) may be added to the steps described with respect to FIG. 7.

At step 705, a computing system may determine a plurality of detected visual features of the plurality of portions of the ATM detected in the plurality of images. For example, ATM security platform 102 may analyze the plurality of images to determine visual features of ATM 104, visual features of portions of ATM 104, and/or visual features between components of ATM 104. In some embodiments, one or more machine learning models may be configured to receive input comprising the plurality of images, detect visual features of the plurality of images, and generate output comprising the plurality of visual features of the plurality of portions of the ATM detected in the plurality of images.

At step 710, a computing system may determine whether the plurality of detected visual features of the plurality of portions of the ATM match the plurality of stored visual features of the plurality of portions of the ATM. For example, ATM security platform 102 may compare the plurality of detected visual features of the plurality of portions of the ATM to the plurality of stored visual features of the plurality of portions of the ATM. ATM security platform 102 may determine one or more differences between the plurality of detected visual features of the plurality of portions of the ATM and the plurality of stored visual features of the plurality of portions of the ATM. Based on a magnitude of the one or more differences between the plurality of detected visual features of the plurality of portions of the ATM and the plurality of stored visual features of the plurality of portions of the ATM being below a similarity threshold, the computing system may determine that the plurality of detected visual features of the plurality of portions of the ATM match the plurality of stored visual features of the plurality of portions of the ATM.

For example, if the differences between detected visual features (e.g., a color and/or shape of an ATM display) and stored visual features are less than one percent (1%), the detected visual features of the ATM display may be determined to match the stored visual features of the ATM display. ATM 104 may generate match data indicating whether the plurality of detected visual features of the plurality of portions of the ATM match the plurality of stored visual features of the plurality of portions of the ATM (e.g., output indicating "YES" or "1" if there is a match, or output indicating "NO" or "0" if there is not a match.

At step 715, a computing system may, based on the plurality of detected visual features of the plurality of portions of the ATM not matching the plurality of stored visual features of the plurality of portions of the ATM, perform step 720. For example, ATM security platform 102 may analyze data indicating that indicating that there is not a match (e.g., data indicating "NO") between the plurality of detected visual features of the plurality of portions of the ATM and the plurality of stored visual features of the plurality of portions of the ATM. Based on the plurality of detected visual features of the plurality of portions of the ATM matching the plurality of stored visual features of the plurality of portions of the ATM, a computing system may perform step 705. For example, the ATM security platform 102 may access and/or analyze data (e.g., data indicating "YES") indicating that the plurality of detected visual features of the plurality of portions of the ATM matches the plurality of stored visual features of the plurality of portions of the ATM.

At step 720, a computing system may deactivate the ATM and/or send a message comprising an indication that the plurality of detected visual features of the plurality of portions of the ATM do not match the plurality of stored visual features of the plurality of portions of the ATM. For example, ATM security platform 102 may deactivate ATM 104 as described herein (e.g., step 550 of method 500) by sending data comprising a deactivation command to ATM 104. By way of further example, ATM security platform 102 may send a message to validation computing system 106. The message may indicate that ATM 104 is deactivated and/or that the plurality of detected visual features of the plurality of portions of the ATM do not match the plurality of stored visual features of the plurality of portions of the ATM. In some embodiments, the message may comprise an image of the portions of the ATM depicting detected visual features that do not match the stored visual features.

Figure 8:
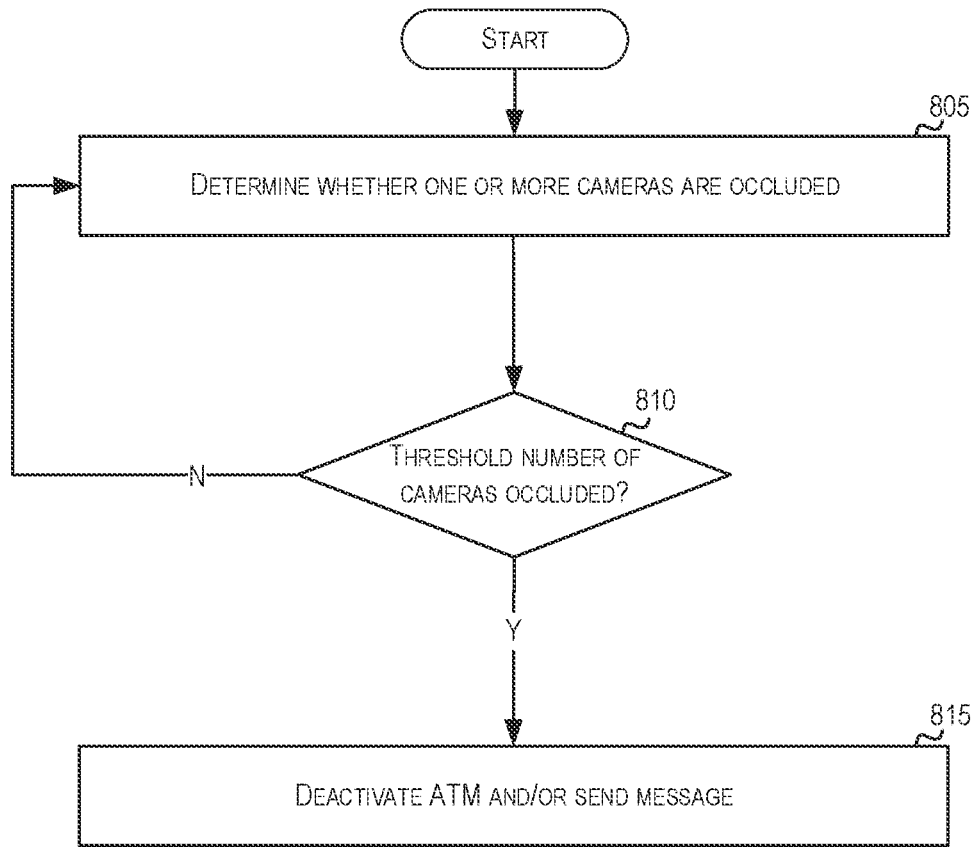
FIG. 8 depicts an illustrative method for automatically detecting obfuscation of cameras used to detect an ATM in accordance with one or more example embodiments.

FIG. 8 depicts an illustrative method for automatically detecting obfuscation of cameras used to detect an ATM in accordance with one or more example embodiments. The steps of a method 800 for automatically detecting obfuscation of cameras used to detect an ATM may be implemented by a computing device or computing system (e.g., the ATM security platform 102) in accordance with the computing devices and/or computing systems described herein. One or more of the steps described with respect to FIG. 8 may be omitted, performed in a different order, and/or modified. Further, one or more other steps (e.g., the steps described with respect to FIGS. 5-7 and 9) may be added to the steps described with respect to FIG. 8.

At step 805, a computing system may determine a number of the one or more cameras that are occluded and/or blocked. For example, ATM security platform 102 may access the one or more cameras and determine which of the one or more cameras is able to capture an image of ATM 104. If the ATM security platform 102 has access to four cameras and is able to capture an image of ATM 104 through two cameras, ATM security platform 102 may determine that two of the cameras are occluded and/or blocked. Further, determining the number of the one or more cameras that are occluded and/or blocked may comprise generating an indication of the number of the one or more cameras that are occluded and/or blocked. For example, ATM security platform 102 may determine that two cameras are occluded and/or blocked and generate the indication "2" to indicate that two cameras are occluded and/or blocked.

At step 810, a computing system may, based on at least a threshold number of the one or more cameras being occluded and/or blocked, perform step 815. For example, a computing system (e.g., the ATM security platform 102) may analyze data indicating that "2" cameras are being occluded and/or blocked may compare the number of cameras being occluded and/or blocked to a threshold number of cameras equal to "2". ATM security platform 102 may then determine that the number of cameras being occluded and/or blocked is at least equal to the threshold number of cameras. Based on the ATM not being used to perform a transaction, step 805 may be performed. For example, the ATM security platform 102 may analyze data indicating that "0" cameras (e.g., no cameras) are being occluded and/or blocked and may compare the number of cameras being occluded and/or blocked to a threshold number of cameras equal to "2". ATM security platform 102 may then determine that the number of cameras being occluded and/or blocked less than the threshold number of cameras.

At step 815, a computing system may deactivate the ATM and/or send a message indicating that one or more of the cameras are occluded and/or blocked. For example, ATM security platform 102 may deactivate ATM 104 as described herein (e.g., step 550 of method 500) by sending data comprising a deactivation command to ATM 104. By way of further example, ATM security platform 102 may send a message to validation computing system 106. The message may indicate that ATM 104 is deactivated and/or a certain number of cameras (e.g., the number of cameras determined at step 805) are occluded and/or blocked.

Figure 9:
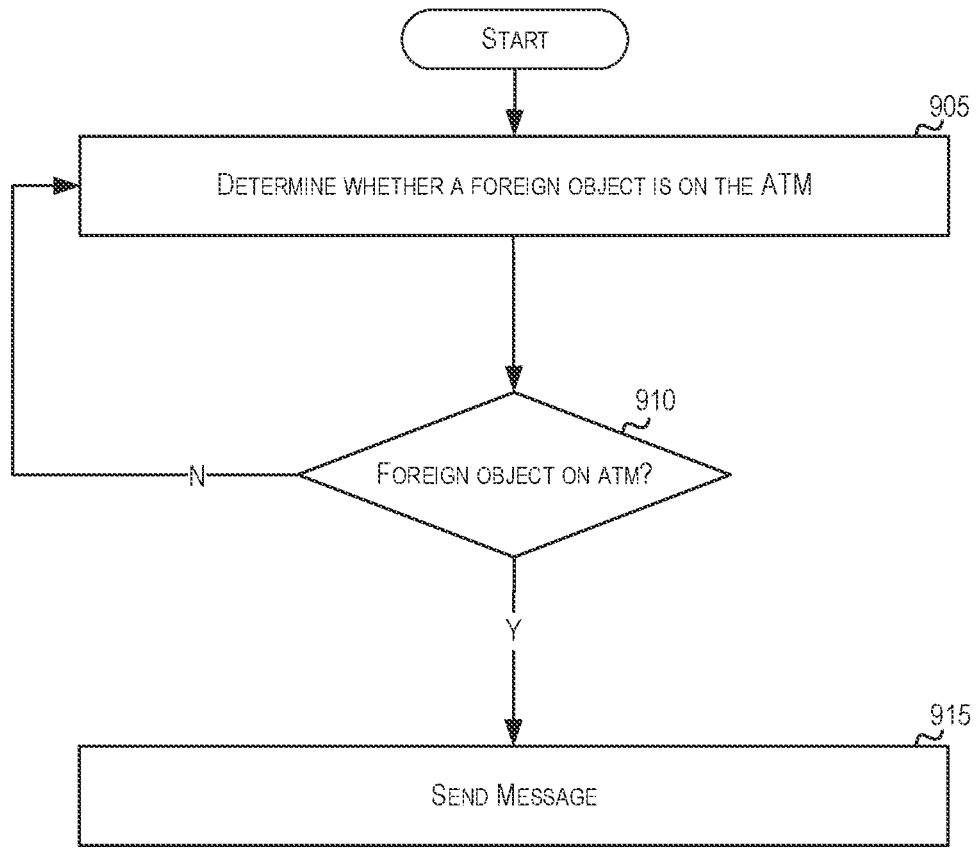
FIG. 9 depicts an illustrative method for automatically detecting foreign objects on an ATM in accordance with one or more example embodiments.

FIG. 9 depicts an illustrative method for automatically detecting foreign objects on an ATM in accordance with one or more example embodiments. The steps of a method 900 for automatically detecting foreign objects on an ATM may be implemented by a computing device or computing system (e.g., the ATM security platform 102) in accordance with the computing devices and/or computing systems described herein. One or more of the steps described with respect to FIG. 9 may be omitted, performed in a different order, and/or modified. Further, one or more other steps (e.g., the steps described with respect to FIGS. 5-8) may be added to the steps described with respect to FIG. 9.

At step 905, a computing system may determine, based on inputting the plurality of images into one or more machine learning models, whether a foreign object is on the ATM or within a predetermined distance of the ATM. The foreign object may comprise a skimming device, one or more keys, a banking card, and/or a smartphone. Determining whether a foreign object is on the ATM or in close proximity (e.g., within a predetermined distance) of the ATM may be based on inputting the plurality of images into the one or more machine learning models. The one or more machine learning models may comprise the features and/or capabilities of machine learning models described herein including the machine learning models described with respect to FIGS. 2 and/or 3. For example, the plurality of images may be inputted into one or more machine learning models that are implemented on the one or more machine learning models 218. The one or more machine learning models 218 may be configured to receive the plurality of images and perform one or more operations including analyzing the plurality of images and generating classification output indicating whether a foreign object was detected.

At step 910, a computing system may, based on a foreign object being detected on the ATM, perform step 915. For example, a computing system (e.g., the ATM security platform 102) may analyze data from the one or more sensors (e.g., motion sensors) and determine that a skimming device and/or smartphone (e.g., a smartphone that may be configured to intercept NFC data and/or capture images of an ATM keypad and/or display) was placed on the ATM. Based on a foreign object not being detected on the ATM, step 905 may be performed. For example, a computing system (e.g., the ATM security platform 102) may analyze the plurality of images and determine that no foreign object was placed on the ATM.

At step 915, a computing system may deactivate the ATM and/or send a message to the validation computing system. The message may comprise an indication that the foreign object is on the ATM. For example, ATM security platform 102 may send a message comprising an indication that a foreign object was placed on ATM 104, an indication of the type of foreign object (e.g., a skimming device that may perform skimming of an ATM), and/or an image of the foreign object and/or ATM 104.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system comprising:
one or more processors; and
memory storing computer-readable instructions that, when executed by the one or more processors, cause the computing system to:
capture, using one or more light detection and ranging devices (LiDAR), a plurality of measured physical dimensions of a plurality of portions of an automated teller machine (ATM);
generate, based on the captured plurality of measured physical dimensions, a digital twin of the ATM, wherein the digital twin is a three-dimensional digital representation of the ATM generated based on the measured dimensions and wherein generating the digital twin includes encoding outputs from the one or more LiDAR devices in digital twin data of the digital twin;
store, in a database, the generated digital twin;
determine, based on data received from one or more sensors detecting at least a thermal signature in an environment comprising (the ATM), whether the ATM is currently in use to perform a transaction;
based on the ATM not currently being in use to perform a transaction, generate, based on video and still image data captured by a one or more cameras that detect the environment comprising the ATM and received via an artificial intelligence-based network infrastructure wherein the one or more cameras are nodes in the infrastructure, a plurality of images of the plurality of portions of the ATM;
analyze, by executing a machine learning model, the plurality of images of the plurality of portions of the ATM;
determine, based on the analyzing, a plurality of estimated dimensions of the plurality of portions of the ATM detected in the plurality of images, wherein the plurality of estimated dimensions are associated with vectors indicating distance and direction of the plurality of portions of the ATM;
retrieve, from the database, the digital twin;
determine whether the plurality of estimated dimensions of the plurality of portions of the ATM match the plurality of measured physical dimensions of the plurality of portions of the ATM;
based on the plurality of estimated dimensions of the plurality of portions of the ATM not matching the plurality of measured physical dimensions of the plurality of portions of the ATM, deactivate the ATM; and
send a message to a validation computing system configured to validate security safeguards of the ATM, wherein the message comprises an indication that the ATM was deactivated.

2. The computing system of claim 1, wherein the digital twin data further comprises a plurality of measured spatial relationships between the plurality of portions of the ATM, and wherein the memory stores additional computer-readable instructions that, when executed by the one or more processors, cause the computing system to:
determine, based on the analyzing, a plurality of estimated spatial relationships of the plurality of portions of the ATM detected in the plurality of images;
determine whether the plurality of estimated spatial relationships of the plurality of portions of the ATM match the plurality of measured spatial relationships of the plurality of portions of the ATM; and
based on the plurality of estimated spatial relationships of the plurality of portions of the ATM not matching the plurality of measured spatial relationships of the plurality of portions of the ATM, deactivate the ATM.

3. The computing system of claim 1, wherein the digital twin data further comprises a plurality of stored visual features of the plurality of portions of the ATM, and wherein the memory stores additional computer-readable instructions that, when executed by the one or more processors, cause the computing system to:
determine, based on the analyzing, a plurality of detected visual features of the plurality of portions of the ATM detected in the plurality of images;
determine whether the plurality of detected visual features of the plurality of portions of the ATM match the plurality of stored visual features of the plurality of portions of the ATM; and
based on the plurality of detected visual features of the plurality of portions of the ATM not matching the plurality of stored visual features of the plurality of portions of the ATM, deactivate the ATM.

4. The computing system of claim 1, wherein the memory stores additional computer-readable instructions that, when executed by the one or more processors, cause the computing system to:
determine a number of the one or more cameras that are occluded; and
based on at least a threshold number of the one or more cameras being occluded, deactivate the ATM.

5. The computing system of claim 1, wherein the memory stores additional computer-readable instructions that, when executed by the one or more processors, cause the computing system to:
determine, based on inputting the plurality of images into the machine learning models, whether a foreign object is present on the ATM, wherein the foreign object comprises a skimming device, one or more keys, a banking card, or a smartphone; and
based on a foreign object being present on the ATM, send a message to the validation computing system, wherein the message comprises an indication that the foreign object is on the ATM.

6. The computing system of claim 1, wherein the memory stores additional computer-readable instructions to determine, based on the data received from the one or more sensors detecting at least a thermal signature in an environment comprising the ATM, whether the ATM is currently in use to perform a transaction, that when executed by the one or more processors, further cause the computing system to:
determine, based on detecting a thermal signature of a user within a predetermined distance of the ATM, that the ATM is currently in use to perform the transaction.

7. The computing system of claim 1, wherein the memory stores additional computer-readable instructions to determine whether the plurality of estimated dimensions of the plurality of portions of the ATM match the plurality of measured physical dimensions of the plurality of portions of the ATM, that when executed by the one or more processors, further cause the computing system to:
input the plurality of images and the digital twin into the machine learning models, wherein the machine learning model is are configured to determine whether the plurality of images match the digital twin of the plurality of portions of the ATM.

8. The computing system of claim 1, wherein the one or more sensors or the one or more cameras are end points of a mist computing infrastructure.

9. The computing system of claim 1, wherein the plurality of portions of the ATM comprise a display, interface elements of the display, a keypad, a cash dispenser, a deposit slot, a card reader, or a receipt printer.

10. The computing system of claim 1, wherein the validation computing system is part of a cloud computing infrastructure configured to communicate with a mist computing infrastructure comprising the one or more sensors or the one or more cameras.

11. A method comprising:
capturing, by a computing device comprising one or more processors and using one or more light detection and ranging devices (LiDAR), a plurality of measured physical dimensions of a plurality of portions of an automated teller machine (ATM);
generating, by the computing device and based on the captured plurality of measured physical dimensions, a digital twin of the ATM, wherein the digital twin is a three-dimensional digital representation of the ATM generated based on the measured dimensions and wherein generating the digital twin includes encoding outputs from the one or more LiDAR devices in digital twin data of the digital twin;
storing, in a database, the generated digital twin;
determining, by the computing device and based on data received from one or more sensors detecting at least a thermal signature in an environment comprising the ATM, whether the ATM is currently in use to perform a transaction;
based on the ATM not currently being in use to perform a transaction, generating, by the computing device, based on video and still image data captured by a one or more cameras that detect the environment comprising the ATM and received via an artificial intelligence-based network infrastructure wherein the one or more cameras are nodes in the infrastructure, a plurality of images of the plurality of portions of the ATM;
analyzing, by the computing device and by executing a machine learning model, the plurality of images of the plurality of portions of the ATM;
determining, by the computing device and based on the analyzing, a plurality of estimated dimensions of the plurality of portions of the ATM detected in the plurality of images, wherein the plurality of estimated dimensions are associated with vectors indicating distance and direction of the plurality of portions of the ATM;
retrieving, by the computing device and from the database, the digital twin;
determining, by the computing device, whether the plurality of estimated dimensions of the plurality of portions of the ATM match the plurality of measured physical dimensions of the plurality of portions of the ATM;
based on the plurality of estimated dimensions of the plurality of portions of the ATM not matching the plurality of measured physical dimensions of the plurality of portions of the ATM, deactivating, by the computing device, the ATM; and
sending, by the computing device, a message to a validation computing system configured to validate security safeguards of the ATM, wherein the message comprises an indication that the ATM was deactivated.

12. The method of claim 11, wherein the digital twin data further comprises a plurality of measured spatial relationships between the plurality of portions of the ATM, and further comprising:
determining, by the computing device and based on the analyzing, a plurality of estimated spatial relationships of the plurality of portions of the ATM detected in the plurality of images;
determining, by the computing device, whether the plurality of estimated spatial relationships of the plurality of portions of the ATM match the plurality of measured spatial relationships of the plurality of portions of the ATM; and
based on the plurality of estimated spatial relationships of the plurality of portions of the ATM not matching the plurality of measured spatial relationships of the plurality of portions of the ATM, deactivating, by the computing device, the ATM.

13. The method of claim 11, wherein the digital twin data further comprises a plurality of stored visual features between the plurality of portions of the ATM, and further comprising:
determining, by the computing device and based on the analyzing, a plurality of detected visual features of the plurality of portions of the ATM detected in the plurality of images;
determining, by the computing device, whether the plurality of detected visual features of the plurality of portions of the ATM match the plurality of stored visual features of the plurality of portions of the ATM; and
based on the plurality of detected visual features of the plurality of portions of the ATM not matching the plurality of stored visual features of the plurality of portions of the ATM, deactivating, by the computing device, the ATM.

14. The method of claim 11, further comprising:
determining, by the computing device, a number of the one or more cameras that are occluded; and
based on at least a threshold number of the one or more cameras being occluded, deactivating, by the computing device, the ATM.

15. The method of claim 11, wherein the determining, by the computing device, based on the data received from the one or more sensors detecting at least a thermal signature in an environment comprising the ATM, whether the ATM is currently in use to perform a transaction comprises:
determining, by the computing device, based on detecting a thermal signature of a user within a predetermined distance of the ATM, that the ATM is being used to perform the transaction.

16. The method of claim 11, wherein the determining, by the computing device, whether the plurality of estimated dimensions of the plurality of portions of the ATM match the plurality of measured physical dimensions of the plurality of portions of the ATM further comprises:
inputting, by the computing device, the plurality of images and the digital twin into the machine learning models, wherein the machine learning model is configured to determine whether the plurality of images match the digital twin of the plurality of portions of the ATM.

17. One or more non-transitory computer-readable media storing instructions that, when executed by a computing device comprising at least one processor, a communication interface, and memory, cause the computing device to:

capture, using one or more light detection and ranging devices (LiDAR), a plurality of measured physical dimensions of a plurality of portions of an automated teller machine (ATM);

generate, based on the captured plurality of measured physical dimensions, a digital twin of the ATM, wherein the digital twin is a three-dimensional digital representation of the ATM generated based on the measured dimensions and wherein generating the digital twin includes encoding outputs from the one or more LiDAR devices in digital twin data of the digital twin;

store, in a database, the generated digital twin;

determine, based on data received from one or more sensors detecting at least a thermal signature in an environment comprising the ATM, whether the ATM is currently in use to perform a transaction;

based on the ATM not currently being in use to perform a transaction, generate, based on video and still images data captured by one or more cameras that detect the environment comprising the ATM and received via an artificial intelligence-based network infrastructure wherein the one or more cameras are nodes in the infrastructure, a plurality of images of the plurality of portions of the ATM;

analyze, by executing a machine learning model, the plurality of images of the plurality of portions of the ATM;

determine, based on the analyzing, a plurality of estimated dimensions of the plurality of portions of the ATM detected in the plurality of images, wherein the plurality of estimated dimensions are associated with vectors indicating distance and direction of the plurality of portions of the ATM;

retrieve, from the database, the digital twin;

determine whether the plurality of estimated dimensions of the plurality of portions of the ATM match the plurality of measured physical dimensions of the plurality of portions of the ATM;

based on the plurality of estimated dimensions of the plurality of portions of the ATM not matching the plurality of measured physical dimensions of the plurality of portions of the ATM, deactivate the ATM; and send a message to a validation computing system configured to validate security safeguards of the ATM, wherein the message comprises an indication that the ATM was deactivated.

* * * * *